May 13, 1930. H. G. REINMUTH 1,758,060
ROLLING PIN
Filed May 28, 1929
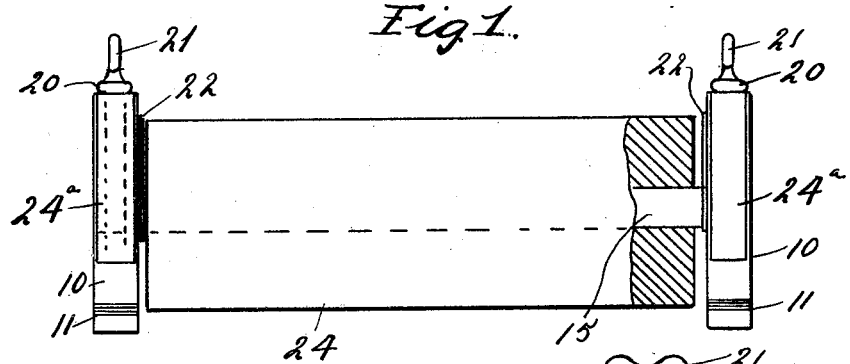
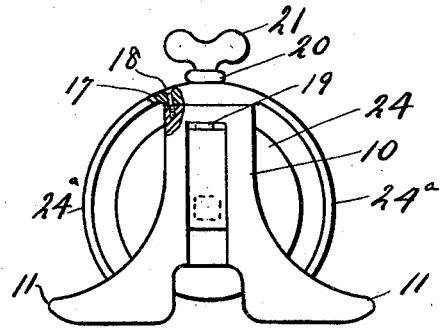
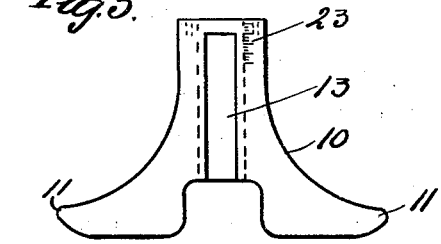
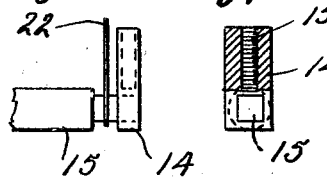
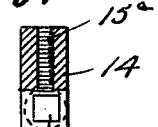
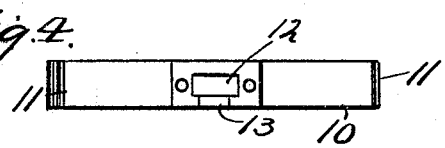
Inventor
Harry G. Reinmuth
By W. W. Williamson
Atty.

Patented May 13, 1930

1,758,060

UNITED STATES PATENT OFFICE

HARRY GEO. REINMUTH, OF PHILADELPHIA, PENNSYLVANIA

ROLLING-PIN

Application filed May 28, 1929. Serial No. 366,717.

My invention relates to new and useful improvements in rolling pins for use by bakers and the like, and has for its object to provide an exceedingly simple and effective construction in which the exact thickness to which dough is to be rolled is predetermined by the adjustment of the device, thereafter requiring no skill on the part of the user of the rolling pin to produce this proper thickness.

A further object of the invention is to provide a simple and convenient handle or hand hold which may be used from either side of the rolling pin.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings, forming a part of this application, in which:—

Fig. 1, is a side elevation of a rolling pin made in accordance with my improvement, the roll being partially broken away to show its mounting upon the stationary shaft.

Fig. 2, is an end elevation of Fig. 1.

Fig. 3, is a detail view of one of the standards looking toward the inner face thereof.

Fig. 4, is a plan view of Fig. 3.

Fig. 5, is a detail view of one of the handles showing the adjusting screw therein.

Fig. 6, is a detail view of one end of the shaft and one of the slide blocks to which said shaft is secured, also showing the pointer needle carried by the shaft.

Fig. 7, is an end view of Fig. 6 showing the slide block, partly broken away and sectioned to show the threaded hole therein for the reception of the adjusting screw.

In carrying out my invention as herein embodied, I provide two standards 10, the base of each of which is extended to form the feet 11; the under surface of which latter are adapted to slide upon the surface of a dough board.

Each of the standards has formed therein a vertical groove 12 through one wall of which is formed the opening or slot 13. 14 represents blocks adapted to slide in these grooves and these blocks are secured upon the ends of the shaft 15, said shaft passing through the slots 13; and while the ends of the shaft may be secured to the slide blocks in any suitable manner, I prefer that these ends be square and driven into corresponding holes formed in the sliding blocks and then spot-welded, since this form of construction makes it convenient for assembling where the device is made on a large production basis.

Each of the sliding blocks has formed therein a vertical hole $15^a$ threaded to receive the adjusting screws 16, each of said screws being journalled in the caps 17, which latter are secured by the screws 18 upon the upper ends of the standards. The screws 16 are provided with the collars 19 and 20 to hold them in proper position in the caps, each of the collars 20 having a thumb piece 21 for manipulation.

22 represents pointer needles carried by the shaft and each of these needles extends upward terminating in front of a graduated scale 23 for the purpose hereinafter set forth.

24 represents the roll or rolling pin which is mounted to revolve upon the shaft 15 in such manner that when the standards are moved back and forth over a mass of dough, said dough will be rolled out to the proper thickness and this thickness may be predetermined by the proper manipulation of the adjusting screws 16 to raise or lower the slide blocks and consequently the shaft and rolling pin carried thereby; the thickness desired being indicated by the position of the pointer needles relative to the graduations 23.

Each of the caps 17 are provided with the hand holds or handles $24^a$ which may be of any convenient shape here shown as semicircular and extending downward and contact with the standards, so that in practice, the operator grasps one of these handles at each end of the device and slides the standards back and forth upon the dough board so that the rolling pin 24 will act upon the dough upon said board to effect the desired results.

The handles being on each side of each standard enables two persons to operate the device at the same time from opposite sides thereof and this is advantageous where a considerable quantity of stiff dough is to be rolled out.

As is well known in trade, it is difficult and requires considerable skill to hand roll dough to a given thickness since it has the peculiar property of reacting or crawling after pressure has been applied thereto and released so that the rolling operation must be oft repeated to effect the desired results, thus making it difficult for the person rolling the dough to determine when the proper thickness has been secured. By the use of my improved rolling pin, this disadvantage is entirely overcome since it is only necessary for the operator to continue to roll the dough by sliding the standards back and forth until said dough has set and the relative distance of the circumference of the roll from the bottom surfaces of the feet will determine the exact thickness of the dough.

Of course I do not wish to be limited to the exact details of construction as herein shown, as these may be varied within the limits of the appended claims without departing from the spirit of my invention.

Having thus fully described my invention, what I claim as new and useful is:—

1. A device of the character described comprising two standards, blocks slidably mounted in said standards, a shaft, the ends of which are secured to said blocks, a rolling pin revolubly mounted upon the shaft, caps secured upon the upper ends of the standards, adjusting screws journalled in the caps, collars carried by the screws to prevent lengthwise movement of the latter, and pointers carried by the shaft and projecting into co-relation with graduations for determining the amount of adjustment given the rolling pin relative to the standards.

2. A device of the character described comprising two standards, blocks slidably mounted in said standards, a shaft, the ends of which are secured to said blocks, a rolling pin revolubly mounted upon the shaft, caps secured upon the upper ends of the standards, adjusting screws journalled in the caps, collars carried by the screws to prevent lengthwise movement of the latter, pointers carried by the shaft and projecting into co-relation with graduations for determining the amount of adjustment given the rolling pin relative to the standards, and curved handles carried by the caps for facilitating the manipulation of the device from either or both sides thereof.

In testimony whereof, I have hereunto affixed my signature.

HARRY GEO. REINMUTH.